US010533613B2

(12) United States Patent
Moon (10) Patent No.: US 10,533,613 B2
(45) Date of Patent: Jan. 14, 2020

(54) BALL-TYPE CONSTANT VELOCITY JOINT

(71) Applicant: HYUNDAI WIA CORPORATION, Changwon-si (KR)

(72) Inventor: Soo Young Moon, Uiwang-si (KR)

(73) Assignee: HYUNDAI WIA CORPORATION, Changwon-si, Gyeongsangnam-Do (KR)

( * ) Notice: Subject to any disclaimer, the term of this patent is extended or adjusted under 35 U.S.C. 154(b) by 218 days.

(21) Appl. No.: 15/606,567

(22) Filed: May 26, 2017

(65) Prior Publication Data

US 2017/0343050 A1    Nov. 30, 2017

(30) Foreign Application Priority Data

May 31, 2016    (KR) .......................... 10-2016-0067299

(51) Int. Cl.
*F16D 3/224* (2011.01)
*F16D 3/223* (2011.01)

(52) U.S. Cl.
CPC ..... *F16D 3/224* (2013.01); *F16D 2003/22303* (2013.01); *Y10S 464/906* (2013.01)

(58) Field of Classification Search
CPC ... F16D 3/224; F16D 3/44; F16D 3/34; F16D 3/223; F16D 2003/22303; Y10S 464/906
USPC ........................................................ 464/145
See application file for complete search history.

(56) References Cited

U.S. PATENT DOCUMENTS

2015/0292565 A1*    10/2015    Govert .................... F16D 3/223

FOREIGN PATENT DOCUMENTS

| CN | 102927146 | * | 4/2015 |
|---|---|---|---|
| CN | 102927146 B | | 4/2015 |
| EP | 2594821 A2 | | 5/2013 |
| GB | 390438 A | | 4/1933 |
| GB | 2312944 A | | 11/1997 |
| JP | 45-6205 | * | 3/1970 |
| JP | S45-006205 A | | 3/1970 |
| KR | 101336506 B1 | | 12/2013 |

OTHER PUBLICATIONS

Extended European Search Report dated Oct. 17, 2017 in European Patent Application No. 17173224.1—7 pages.

* cited by examiner

*Primary Examiner* — Greg Binda
(74) *Attorney, Agent, or Firm* — Knobbe Martens Olson & Bear LLP (57) ABSTRACT

A joint includes an outer race, a first inner race installed in the outer race and a second inner race installed in the first inner race. The outer race includes an inner surface and first grooves formed on the inner surface. The first inner race includes an outer surface, an inner surface and second grooves formed on the outer surface, and a plurality of third grooves formed on the inner surface. First balls are disposed between the first grooves and the second grooves for transmitting rotation of the first inner race to the outer race. The second inner race includes an outer surface and fourth grooves formed on the outer surface. Second balls disposed between the third grooves and the fourth grooves for transmitting rotation of the second inner race to the first inner race.

9 Claims, 8 Drawing Sheets

BALL-TYPE CONSTANT VELOCITY JOINT

CROSS-REFERENCES TO RELATED APPLICATIONS

The present application claims priority to Korean application number 10-2016-0067299, filed on May 31, 2016, which is incorporated by reference in its entirety.

BACKGROUND OF THE INVENTION

The present invention relates to a ball-type constant velocity joint, and more particularly, to a ball-type constant velocity joint which is capable of increasing a maximum bending angle while preventing a reduction in strength and durability.

In general, a ball-type constant velocity joint which is installed at the wheel side of a shaft, among constant velocity joints, is bent while the rotation angle of an outer race is changed by balls. The ball-type constant velocity joint is bent to a maximum of 50 degrees, and the contact areas between the balls and an inner race and between the balls and the outer race relatively decrease at a large bending angle portion. In this case, the surface pressure may increase to degrade the strength and durability. Therefore, there is a demand for a structure capable of solving such a problem.

The related art is disclosed in Korean Patent Registration No. 10-1336506 published on Nov. 27, 2013 and entitled "Ball-type constant velocity joint for vehicle".

SUMMARY OF THE INVENTION

Embodiments of the present invention are directed to a ball-type constant velocity joint capable of increasing a maximum bending angle while preventing a reduction of strength and durability through a second inner race part installed in a first inner race part.

In one embodiment, a ball-type constant velocity joint may include: an outer race part installed on a shaft and having a plurality of first grooves formed axially in the inner surface thereof; a first inner race part including: a first inner race rotatably installed in the outer race part, having a plurality of second grooves formed on the outer surface thereof and facing the first grooves, and having a plurality of third grooves formed axially on the inner surface thereof; and a plurality of first balls installed between the first grooves and the second grooves, and transmitting rotation power of the first inner race to the outer race part; and a second inner race part including: a second inner race rotatably installed in the first inner race, and having a plurality of fourth grooves formed on the outer surface thereof and facing the third grooves; and a plurality of second balls installed between the third grooves and the fourth grooves, and transmitting rotation power of the second inner race to the first inner race.

The second grooves and the third grooves may be alternately arranged on the outer surface and the inner surface of the first inner race.

When the shaft is rotated within a preset angle, the second inner race part may be rotated about the first inner race part in the same direction and by the same angle as the rotation of the shaft.

The preset angle may be 30 degrees.

When the shaft is rotated over the preset angle, the second inner race part may be rotated about the first inner race part, and the first inner race part may be rotated about the outer race part.

The second inner race part may be rotated by the preset angle in the same direction as the rotation direction of the shaft.

The rotation angle of the shaft may be equal to the sum of the rotation angle of the second inner race part about the first inner race part and the rotation angle of the first inner race part about the outer race part.

The preset angle may be 30 degrees.

The first inner race part may further include a first cage installed between the outer race part and the first inner race, and having a plurality of first windows to support the plurality of first balls.

The second inner race part may further include a second cage installed between the second inner race and the first inner race, and having a plurality of second windows to support the plurality of second balls.

DESCRIPTION OF SPECIFIC EMBODIMENTS

Hereafter, a ball-type constant velocity joint in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
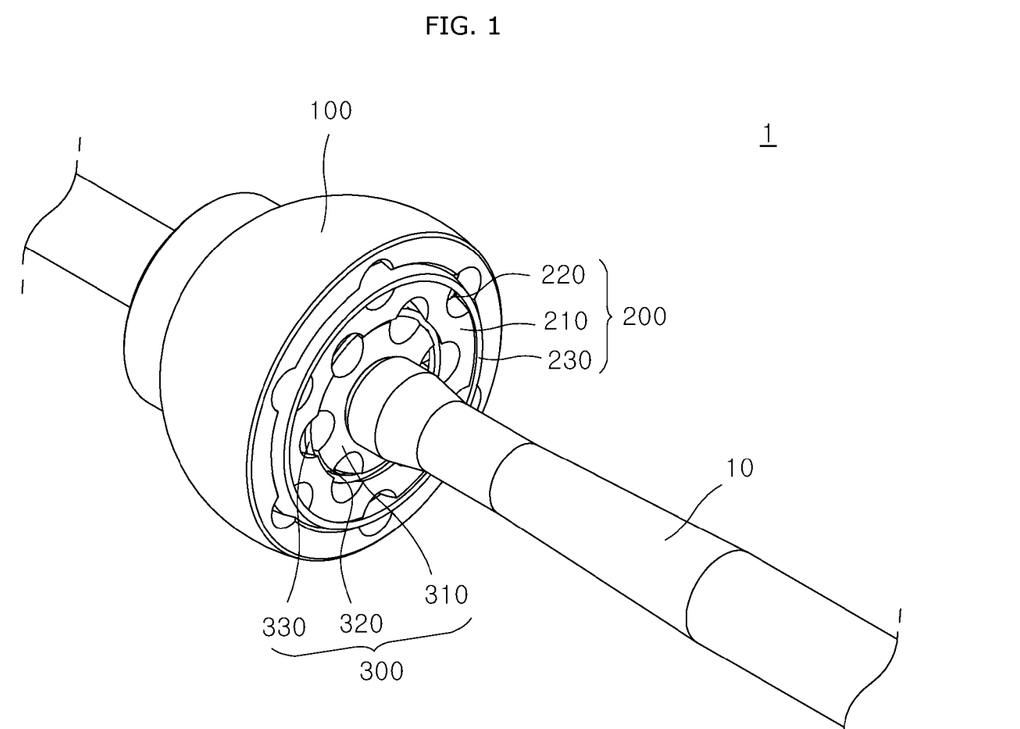
FIG. 1 is a perspective view of a ball-type constant velocity joint in accordance with an embodiment of the present invention.
Figure 2:
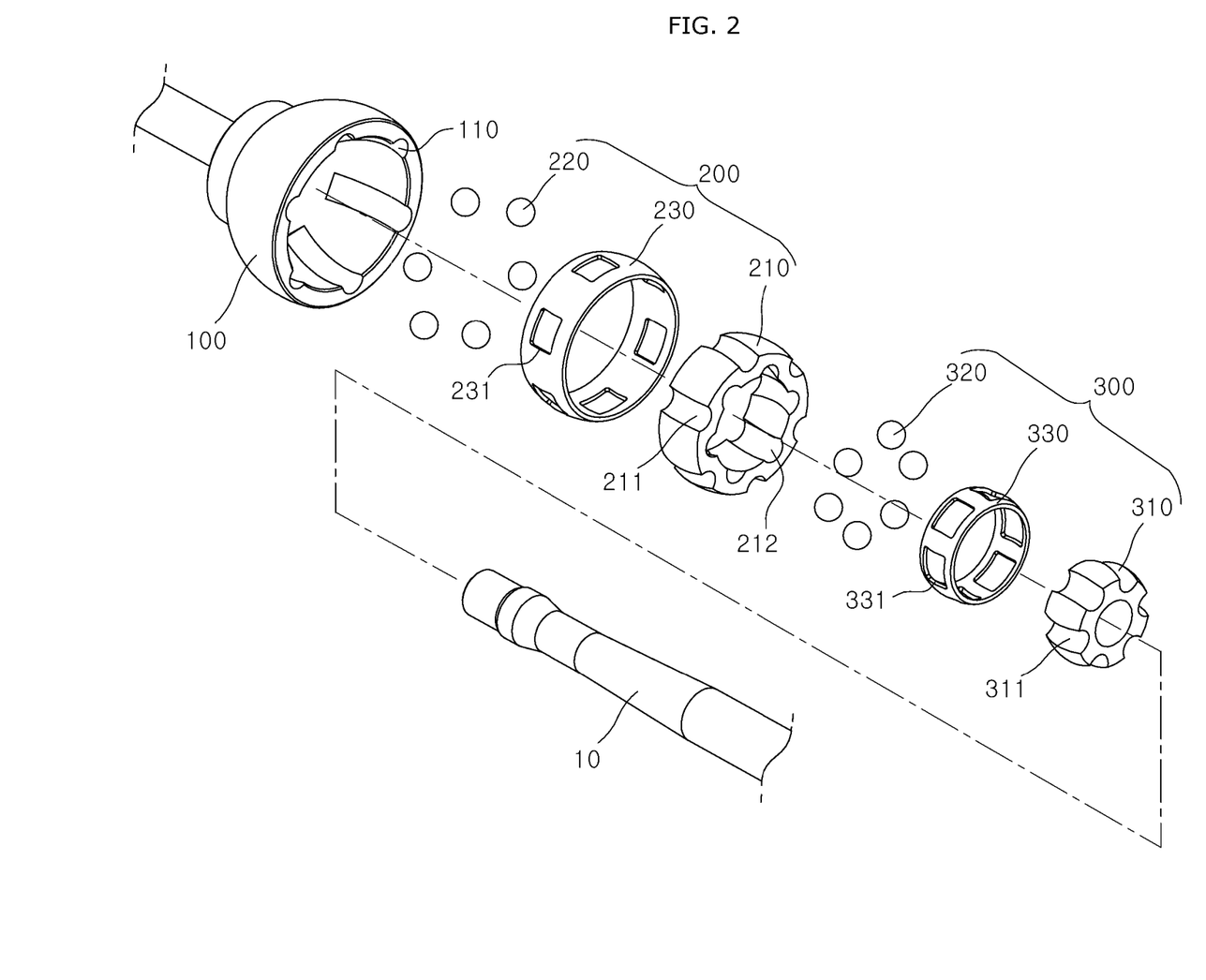
FIG. 2 is an exploded perspective view of the ball-type constant velocity joint in accordance with the embodiment of the present invention.
Figure 3:
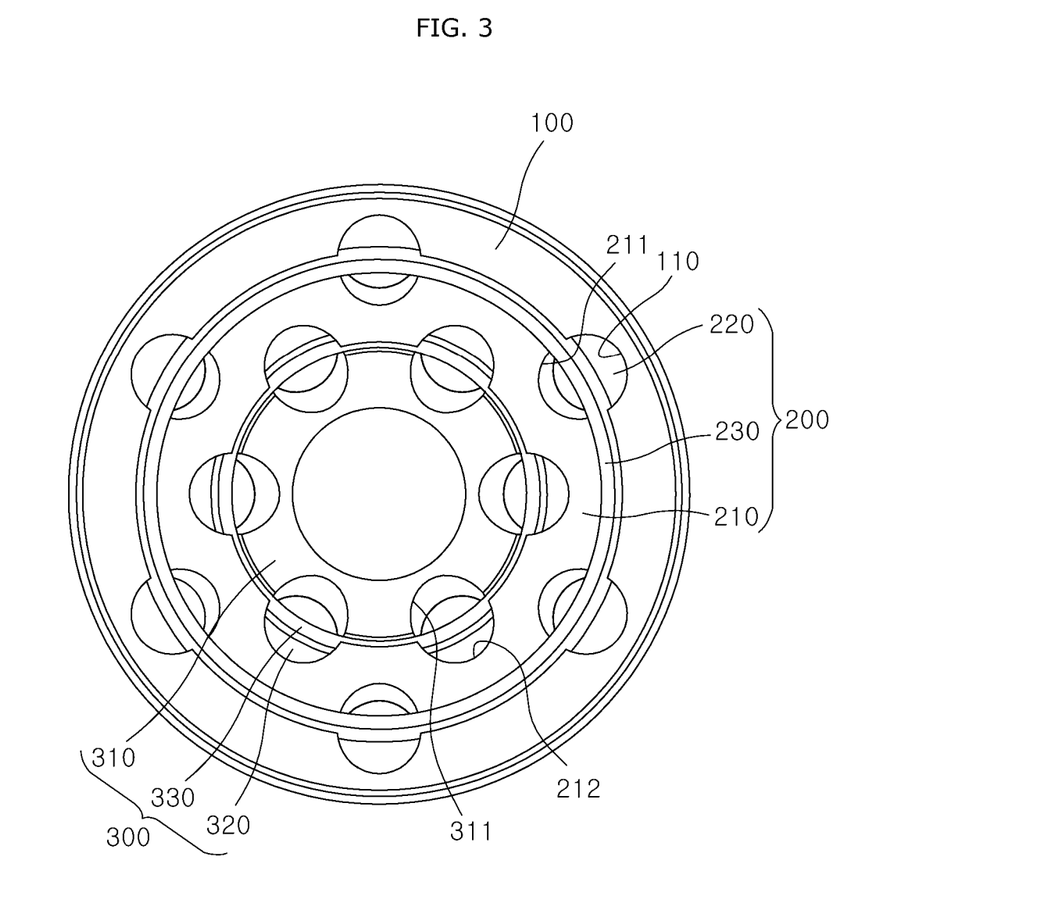
FIG. 3 is a front view of the ball-type constant velocity joint in accordance with the embodiment of the present invention.
Figure 4:
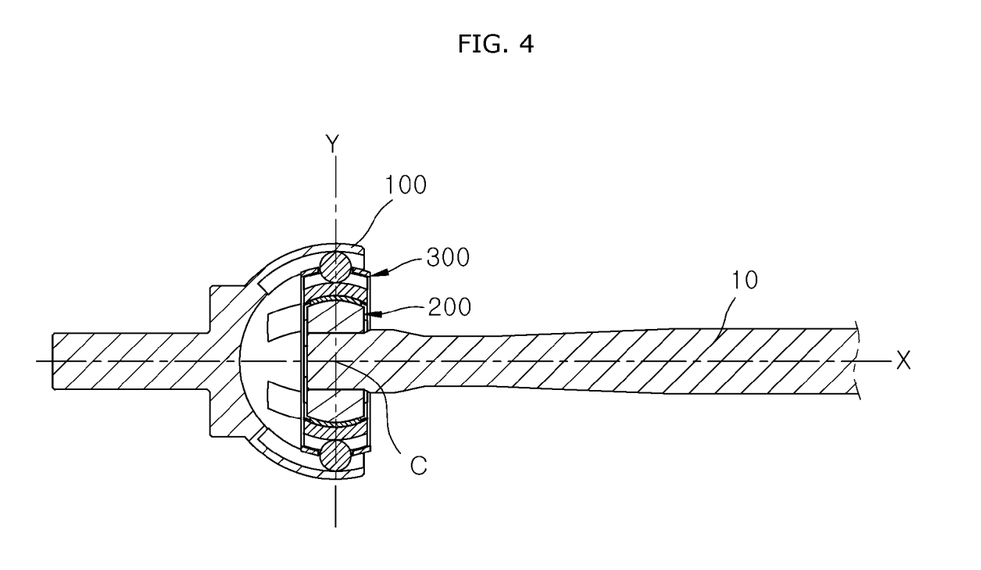
FIG. 4 is a cross-sectional view of the ball-type constant velocity joint in accordance with the embodiment of the present invention.
Figure 5:
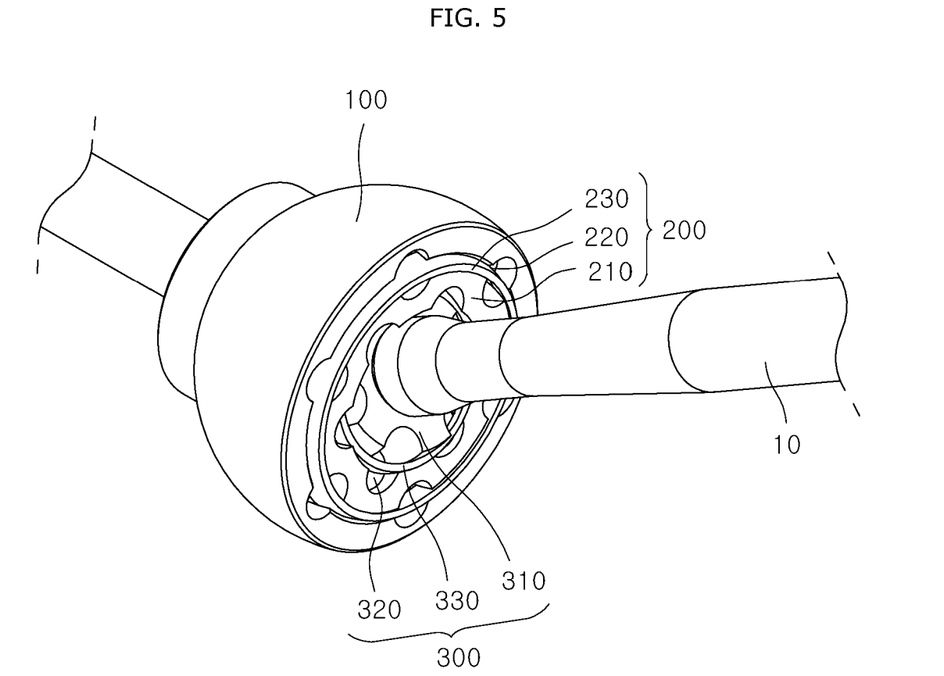
FIG. 5 is a perspective view illustrating that the ball-type constant velocity joint in accordance with the present embodiment is bent by 30 degrees.
Figure 6:
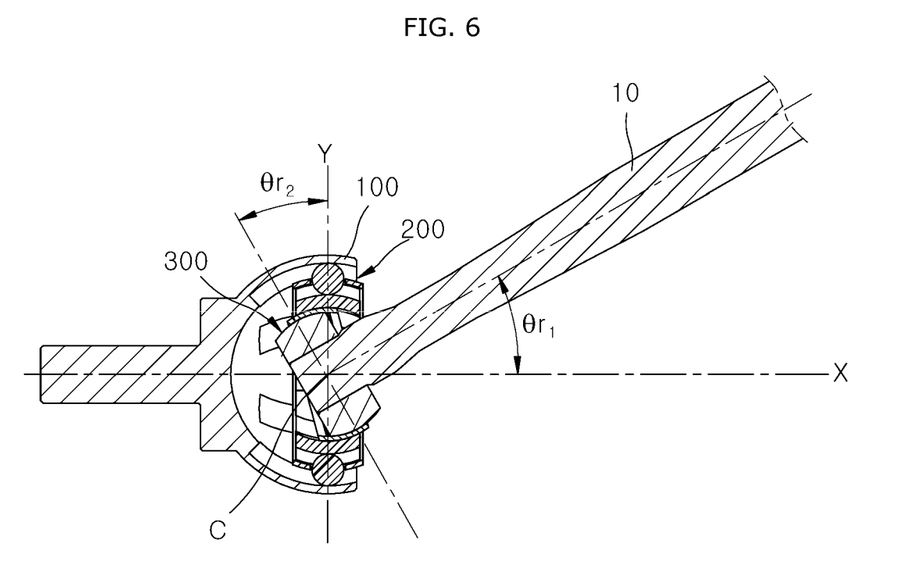
FIG. 6 is a cross-sectional view illustrating that the ball-type constant velocity joint in accordance with the present embodiment is bent by 30 degrees.
Figure 7:
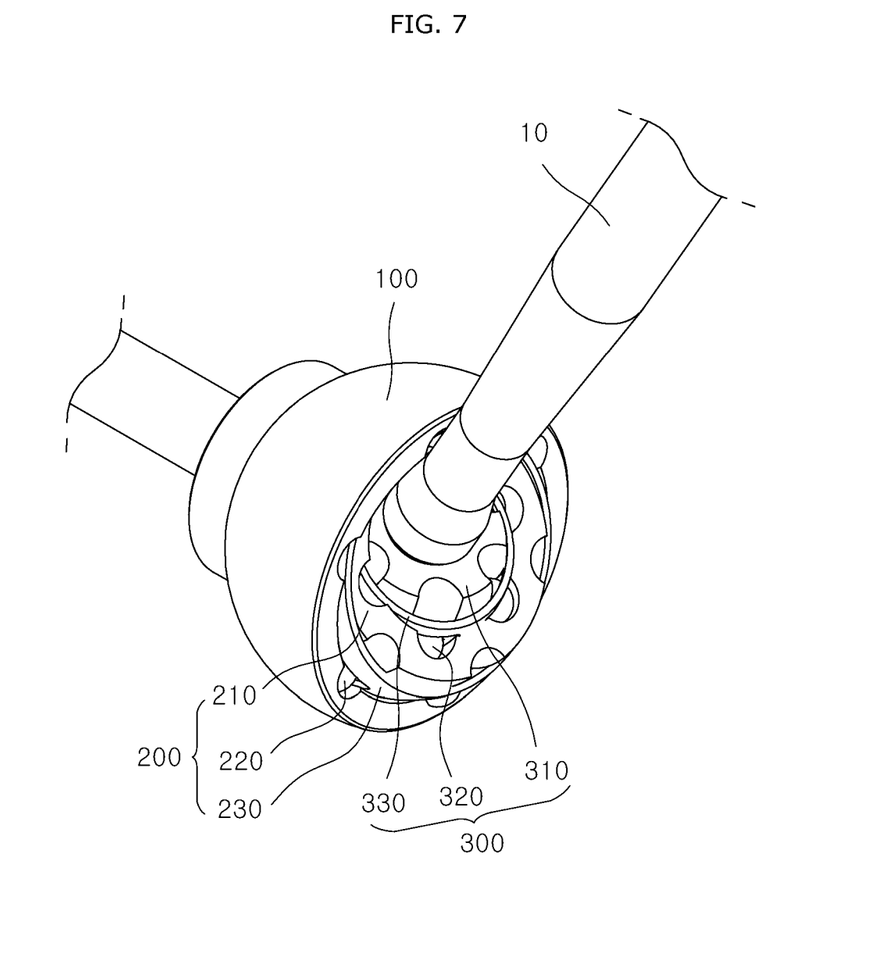
FIG. 7 is a perspective view illustrating that the ball-type constant velocity joint in accordance with the present embodiment is bent by 60 degrees.
Figure 8:
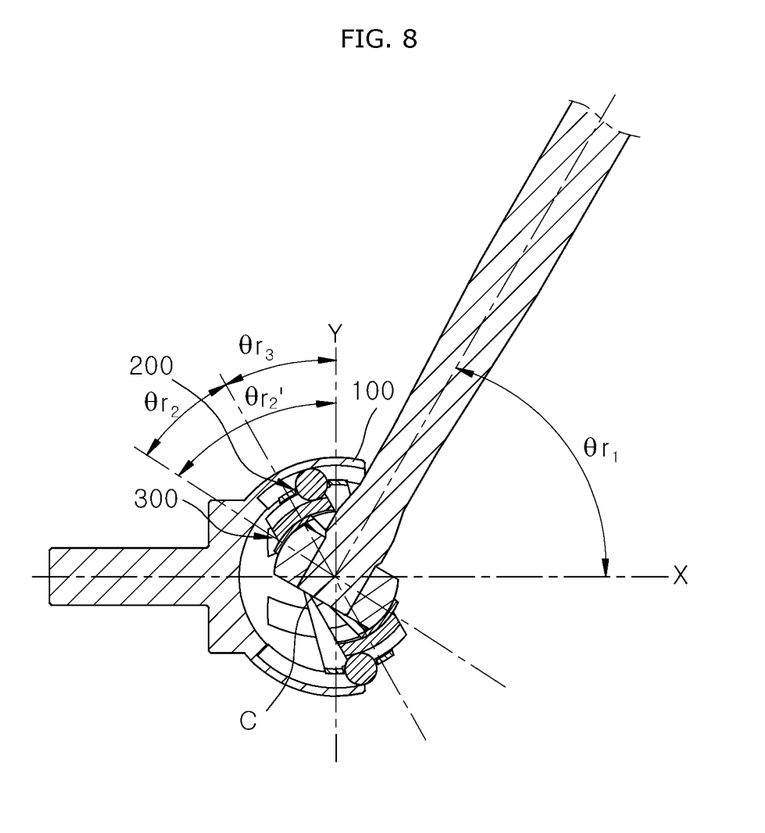
FIG. 8 is a cross-sectional view illustrating that the ball-type constant velocity joint in accordance with the present embodiment is bent by 60 degrees.

FIG. 1 is a perspective view of a ball-type constant velocity joint in accordance with an embodiment of the present invention, FIG. 2 is an exploded perspective view of the ball-type constant velocity joint in accordance with the embodiment of the present invention, FIG. 3 is a front view of the ball-type constant velocity joint in accordance with the embodiment of the present invention, FIG. 4 is a cross-sectional view of the ball-type constant velocity joint in accordance with the embodiment of the present invention, FIG. 5 is a perspective view illustrating that the ball-type constant velocity joint in accordance with the present embodiment is bent by 30 degrees, FIG. 6 is a cross-sectional view illustrating that the ball-type constant velocity joint in accordance with the present embodiment is bent by 30 degrees, FIG. 7 is a perspective view illustrating that the ball-type constant velocity joint in accordance with the present embodiment is bent by 60 degrees, and FIG. 8 is a cross-sectional view illustrating that the ball-type constant velocity joint in accordance with the present embodiment is bent by 60 degrees.

Referring to FIGS. 1 to 4, the ball-type constant velocity joint 1 in accordance with the embodiment of the present invention may include an outer race part 100, a first inner race part 200 and a second inner race part 300.

The outer race part 100 may be installed at an end of a shaft 10, and have a plurality of first grooves 110 formed axially on the inner surface thereof. The inner surface of the outer race part 100 may be formed in a semispherical shape, and cover the outer surface of the ring-shaped first inner race 210.

The first inner race part 200 may include a first inner race 210, a plurality of first balls 220 and a first cage 230.

The first inner race 210 may be rotatably installed in the outer race part 100. The first inner race 210 may have a plurality of second grooves 211 formed on the outer surface thereof and facing the first grooves 110. Furthermore, the first inner race 210 may have a plurality of third grooves 212 formed axially on the inner surface thereof.

The first grooves 110 and the second grooves 211 may have a cross-section formed in a semi-circle shape. The first grooves 110 and the second grooves 211 may be arranged to face each other, thereby forming circles as a whole. When the first balls 220 are seated between the first grooves 110 and the second grooves 211, the first balls 220 may be covered by the first grooves 110 and the second grooves 211. The third grooves 212 covering second balls 320 may also have a cross-section in a semi-circle shape (refer to FIG. 3).

The plurality of first balls 220 may be installed between the first grooves 110 and the second grooves 211, and transmit rotation power of the first inner race 210 to the outer race part 100. Specifically, the rotation power of the shaft 10 may be transmitted to the first inner race 210 through the second inner race 310 and the second balls 320, and then transmitted to the outer race part 100 through the first balls 220.

The first cage 230 may be installed between the outer race part 100 and the first inner race 210, and have a plurality of first windows 231 to support the plurality of first balls 220. The first cage 230 may have a ring-shape structure in which the plurality of first windows 231 are formed in the circumferential direction. The plurality of first balls 220 may be disposed in the respective first windows 231.

The second inner race part 300 may include the second inner race 310, the plurality of second balls 320 and a second cage 330.

The second inner race 310 may be rotatably installed in the first inner race 210, and have a plurality of fourth grooves 311 formed on the outer surface thereof and facing the third grooves 212. The fourth grooves 311 may be formed in the axial direction of the second inner race 310, and have a semi-circle shape like the third grooves 212. Therefore, when the third grooves 212 and the fourth grooves 311 are arranged to face each other, the third grooves 212 and the fourth grooves 311 may form circles to cover the outsides of the second balls 320 (refer to FIG. 3).

The plurality of second balls 320 may be installed between the third grooves 212 and the fourth grooves 311, and transmit rotation power of the second inner race 310 to the first inner race 210.

The second cage 330 may be installed between the second inner race 310 and the first inner race 210, and have a plurality of second windows 331 to support the plurality of second balls 320. The second cage 330 may have a ring-shape structure in which the plurality of second windows 331 are formed in the circumferential direction. The plurality of second balls 320 may be disposed in the respective second windows 331.

The second grooves 211 may be arranged at positions deviating from the third grooves 212. As illustrated in FIG. 3, the second grooves 211 may be arranged on the outer surface of the first inner race 210 so as to be spaced from each other at a predetermined distance in the circumferential direction, and the third grooves 212 may be arranged on the inner surface of the first inner race 210 so as to be spaced from each other at a predetermined distance in the circumference direction. At this time, the third grooves 212 may be arranged at positions deviating from the second grooves 211. That is, the second grooves 211 and the third grooves 212 may be alternately arranged on the outer surface and inner surface of the first inner race 210.

Therefore, the first balls 220 installed between the first grooves 110 and the second grooves 211 and the second balls 320 installed between the third grooves 212 and the fourth grooves 311 may deviate from each other. That is, when a virtual straight line is drawn toward the outside from the center of the first inner race 210, the first balls 220 and the second balls 320 may not be placed on the same straight line.

Such a structure can prevent a stress concentration when the rotation power of the shaft 10 is transmitted to the first and second inner races 210 and 310 through the first balls 220 and the second balls 320.

When the shaft 10 is rotated within a preset angle based on a horizontal central axis X, the second inner race part 300 may be rotated about the first inner race part 200 in the same direction and by the same angle as the rotation of the shaft 10.

When the shaft 10 is rotated over the preset angle based on the horizontal central axis X, the second inner race part 300 may be rotated about the first inner race part 200, and the first inner race part 200 may also be rotated about the outer race part 100. The second inner race part 300 may be rotated by the preset angle in the same direction as the rotation of the shaft 10. In the present embodiment, the preset angle may be 30 degrees.

When the shaft 10 is rotated within the preset angle of 30 degrees based on the horizontal central axis X, the second inner race part 300 may be rotated about the first inner race part 200 in the same direction and by the same angle as the rotation of the shaft 10.

Referring to FIG. 6, when the rotation angle $\theta r_1$ of the shaft 10 is equal to or less than 30 degrees, the second inner race part 300 may be rotated in the same direction at the same rotation angle $\theta r_2$ as the rotation angle $\theta r_1$ of the shaft 10 by the rotation power of the shaft 10.

Referring to FIGS. 5 and 6, when the shaft 10 is rotated by 30 degrees (counterclockwise direction in FIG. 6) based on the horizontal central axis X, the second inner race part 300 may be rotated by 30 degrees (counterclockwise direction in FIG. 6) about the vertical central axis Y. That is, the second inner race part 300 may be rotated by 30 degrees (counterclockwise direction in FIG. 6) about the first inner race part 200. The horizontal central axis X may indicate a virtual axis formed in the horizontal direction based on the rotation center C of the shaft 10. Also, the vertical central axis Y may indicate a virtual axis formed in the vertical direction based on the rotation center C of the shaft 10 (based on FIG. 6).

If the shaft 10 is rotated over the preset angle of 30 degrees (counterclockwise direction in FIG. 6) based on the horizontal central axis X, the shaft 10 may come in contact with the inner surface of the first inner race 210, thereby causing interference. That is, it is possible to prevent the second inner race part 300 from being rotated over 30 degrees about the first inner race part 200.

Since the second inner race part 300 is not rotated over 30 degrees about the first inner race part 200, the surface pressure between the second balls 320 and the first inner race 210 may be increased to prevent a reduction in strength and durability of the first inner race 210, when the second balls 320 are rotated to transmit the rotation power of the second inner race 310 to the first inner race 210 and comes in surface contact with the first inner race 210.

When the shaft 10 is rotated over the preset angle of 30 degrees based on the horizontal central axis X, the second inner race part 300 may be rotated about the first inner race part 200, and the first inner race part 200 may also be rotated about the outer race part 100.

That is, when the rotation angle of the shaft 10 exceeds the preset angle of 30 degrees, the rotation of the shaft 10 may be accomplished while the second inner race part 300 and the first inner race part 200, that is, the two inner race parts 200 and 300 are performed at the same time. The rotation of the second inner race part 300 may indicate that the second inner race part 300 is rotated about the first inner race part 200, and the maximum rotation angle of the second inner race part 300 may be set to 30 degrees equal to the preset angle. Also, the rotation of the first inner race part 200 may indicate that the first inner race part 200 is rotated about the outer race part 100, and the first inner race part 200 may be rotated to the maximum angle of 30 degrees about the outer race part 100.

For example, when the shaft 10 is rotated at 45 degrees, the second inner race part 300 may be primarily rotated by 30 degrees about the first inner race part 200. The rest of 15 degrees in the rotation angle of the shaft 10 may be accomplished while the first inner race part 200 is rotated about the outer race part 100.

For another example, when the shaft 10 is rotated at 55 degrees, the second inner race part 300 may be primarily rotated by 30 degrees about the first inner race part 200, and the rest of 25 degrees may be achieved while the first inner race part 200 is rotated about the outer race part 100.

In other words, when the rotation angle $\theta r_1$ of the shaft 10 exceeds the preset angle of 30 degrees, the second inner race part 300 may be secondarily rotated by the rotation angle $\theta r_3$ of the first inner race part 200 by the rotation of the first inner race part 200 after the rotation angle $\theta r_2$ was primarily achieved by the preset angle of 30 degrees. Thus, while the total rotation angle of the second inner race part 300 becomes $\theta r_2' (=\theta r_2 + \theta r_3)$, the second inner race part 300 may have the same rotation angle as the rotation angle $\theta r_1$ of the shaft 10.

Referring to FIGS. 7 and 8, when the shaft 10 is rotated by 60 degrees (counterclockwise direction in FIG. 8) based on the horizontal central axis X, the second inner race part 300 may be preferentially rotated by the preset angle of 30 degrees (counterclockwise direction in FIG. 8) about the first inner race part 200, and the first inner race part 200 may be then rotated by 30 degrees (counterclockwise direction in FIG. 8) about the vertical central axis Y.

Thus, in addition to the rotation angle $\theta r_2$ about the first inner race part 200, the second inner race part 300 may be rotated by the same angle even when the first inner race part 200 is rotated about the outer race part 100. Therefore, the additional rotation angle $\theta r_3$ may be obtained.

In other words, when the first inner race part 200 is rotated by 30 degrees ($\theta r_3$ in the counterclockwise direction of FIG. 8) about the outer race part 100, the second inner race part 300 may be further rotated by 30 degrees ($\theta r_3$ in the counterclockwise direction pf FIG. 8) in a state where the second inner race part 300 was rotated by 30 degrees ($\theta r_2$ in the counterclockwise direction of FIG. 8).

If the shaft 10 is rotated over 60 degrees (counterclockwise direction in FIG. 8) based on the horizontal central axis X, the shaft 10 may come in contact with the inner surface of the outer race part 100, thereby causing interference (refer to FIG. 8). That is, the second inner race part 300 can be prevented from being rotated over 30 degrees (counterclockwise direction in FIG. 8) about the first inner race part 200, and the first inner race part 200 can be prevented from being rotated over 30 degrees (counterclockwise direction in FIG. 8) about the outer race part 100. Therefore, the second inner race part 300 can be rotated up to 60 degrees (counterclockwise direction in FIG. 8). Thus, the ball-type constant velocity joint 1 may be bent to the maximum angle of 60 degrees. At this time, the second balls 320 may be already rotated by 45 degrees ($=\theta r_2/2 + \theta r_3$), and the first balls 220 may be already rotated by 15 degrees ($=\theta r_3/2$). Similarly, the second cage 330 may be positioned at a location corresponding to ¾ of the rotation angle of the shaft 10, and the first cage 230 may be positioned at a location corresponding to ¼ of the rotation angle of the shaft 10. That is, the bending angles of the first and second cages 230 and 330 may correspond to ½ of the bending angle of the shaft 10.

As such, the second inner race part 300 cannot be rotated over the preset angle of 30 degrees about the first inner race part 200, and the first inner race part 200 cannot be rotated over the preset angle of 30 degrees about the outer race part 100. Thus, when the second balls 320 are rotated to transmit the rotation power of the second inner race 310 to the first inner race 210 and come in surface contact with the first inner race 210, and the first balls 220 come in surface contact with the outer race part 100 so as to transmit the rotation power of the first inner race 210 to the outer race part 100, the surface pressure between the second balls 320 and the first inner race 210 and the surface pressure between the first balls 220 and the outer race part 100 may be increased to prevent a reduction in strength and durability of the first inner race 210 and the outer race part 100.

The ball-type constant velocity joint 1 in accordance with the embodiment of the present invention may be designed to have the double inner race structure in which the second inner race part 300 is installed in the first inner race part 200. Therefore, the ball-type constant velocity joint 1 can prevent a relative reduction in the contact area between the second balls 320 and the first inner race 210 and the contact area between the first balls 220 and the outer race part 100, thereby not only preventing a reduction in strength and durability due to an increase of surface pressure, but also increasing the maximum bending angle.

In accordance with the embodiment of the present invention, the ball-type constant velocity joint can increase the maximum bending angle while preventing a reduction in strength and durability through the second inner race part installed in the first inner race part.

Furthermore, since the second grooves and the third grooves are arranged to deviate from each other, the first balls installed between the first grooves and the second grooves and the second balls installed between the third grooves and the fourth grooves may deviate from each other, which makes it possible to prevent a stress concentration when the rotation power of the shaft is transmitted to the first inner race and the second inner race through the first balls and the second balls.

Furthermore, when the shaft is rotated over the present angle based on the horizontal central axis, the second inner race part may be rotated about the first inner race part, and the first inner race part may be rotated about the outer race part. Thus, the surface pressure between the second balls and the first inner race and the surface pressure between the first balls and the outer race part may be increased to prevent a reduction in strength and durability of the ball-type constant velocity joint.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A ball-type constant velocity joint comprising:
    an outer race rotatable around an axis, wherein the outer race comprises an inner surface and a plurality of first grooves formed on the inner surface;
    a first inner race pivotably installed in the outer race, wherein the first inner race comprises an outer surface, an inner surface, a plurality of second grooves formed on the outer surface and facing the first grooves, and a plurality of third grooves formed on the inner surface of the first inner race;
    a plurality of first balls installed between the first grooves and the second grooves, and configured to transmit rotation of the first inner race to the outer race;
    a second inner race part a second inner race pivotably installed in the first inner race, wherein the second inner race comprises an outer surface and a plurality of fourth grooves formed on the outer surface of the second inner race and facing the third grooves;
    a plurality of second balls installed between the third grooves and the fourth grooves, and configured to transmit rotation of the second inner race to the first inner race; and
    a shaft fixed to the second inner race,
    wherein when the shaft pivots within a first preset angle with respect to the axis, the shaft and the second inner race are configured to pivot together with respect to the first inner race,
    wherein when the shaft pivots by the first preset angle, the shaft contacts the second inner race,
    wherein when the shaft pivots over the first preset angle at which the shaft contacts the second inner race, the first inner race is configured to pivot with respect to the outer race.

2. The ball-type constant velocity joint of claim 1, wherein the second grooves and the third grooves are alternately arranged on the outer surface and the inner surface of the first inner race.

3. The ball-type constant velocity joint of claim 1, wherein the first preset angle is 30 degrees.

4. The ball-type constant velocity joint of claim 1, wherein when the shaft pivots over the first preset angle and within a second preset angle with respect to the axis, the second inner race and the first inner race pivot together with respect to the outer race.

5. The ball-type constant velocity joint of claim 4, wherein when the shaft pivots by the second preset angle, the shaft contacts the outer race.

6. The ball-type constant velocity joint of claim 4, wherein a pivoting angle of the shaft is equal to the sum of a pivoting angle of the second inner race with respect to the first inner race and a pivoting angle of the first inner race with respect to the outer race.

7. The ball-type constant velocity joint of claim 4, wherein the second preset angle is 60 degrees.

8. The ball-type constant velocity joint of claim 1, further comprising a first cage installed between the outer race and the first inner race, and having a plurality of first windows configured to retain the plurality of first balls.

9. The ball-type constant velocity joint of claim 1, further comprising a second cage installed between the second inner race and the first inner race, and having a plurality of second windows configured to retain the plurality of second balls.

* * * * *